United States Patent
Brunet et al.

(10) Patent No.: US 7,747,284 B2
(45) Date of Patent: Jun. 29, 2010

(54) TERMINAL DEVICE FOR A BI-DIRECTIONAL RADIO RELAY LINK

(75) Inventors: Francois Brunet, Acigne (FR); Yvon Dutertre, Cesson Sevigne (FR); Alain Leveque, St Gregoire (FR)

(73) Assignee: France Telecom, Paris (FR)

( * ) Notice: Subject to any disclaimer, the term of this patent is extended or adjusted under 35 U.S.C. 154(b) by 1297 days.

(21) Appl. No.: 10/552,475

(22) PCT Filed: Mar. 31, 2004

(86) PCT No.: PCT/FR2004/000816

§ 371 (c)(1),
(2), (4) Date: Oct. 7, 2005

(87) PCT Pub. No.: WO2004/093338

PCT Pub. Date: Oct. 28, 2004

(65) Prior Publication Data
US 2006/0203751 A1 Sep. 14, 2006

(30) Foreign Application Priority Data
Apr. 8, 2003 (FR) .................................. 03 04425

(51) Int. Cl.
*H04M 1/00* (2006.01)
(52) U.S. Cl. .................... 455/562.1; 455/82; 455/550.1; 455/553.1
(58) Field of Classification Search ............. 455/80–82, 455/550.1, 91, 95, 130, 73, 84, 334, 78, 129, 455/552.1, 553.1, 561, 562.1
See application file for complete search history.

(56) References Cited

U.S. PATENT DOCUMENTS

| 5,691,978 A | 11/1997 | Kenworthy |
| 6,356,528 B1 * | 3/2002 | Lundby et al. ............... 370/209 |
| 7,142,824 B2 * | 11/2006 | Kojima et al. ................. 455/78 |

FOREIGN PATENT DOCUMENTS

| FR | 2 744 308 A1 | 8/1997 |
| WO | 02/19591 A2 | 3/2002 |

* cited by examiner

*Primary Examiner*—Nhan Le
(74) *Attorney, Agent, or Firm*—Lowe Hauptman Ham & Berner LLP

(57) ABSTRACT

The bandwidth for transmission and reception in a bi-directional radio relay link with two simultaneous broadcasts and receptions is reduced by half. Each terminal device comprises a first broadcaster for broadcasting a first data signal, via a first antenna, in a first used frequency band identical to that in which a first receiver receives a second data signal via a second antenna. A second receiver receives, via the first antenna, a third data signal with a second frequency band and a second broadcaster broadcasts, via a second antenna, a fourth data signal with the second frequency band.

1 Claim, 5 Drawing Sheets

TERMINAL DEVICE FOR A BI-DIRECTIONAL RADIO RELAY LINK

The present invention relates to terminal equipment for a bidirectional radio link.

This radio link is primarily intended to transmit in two opposite directions two digital data signals having bit rates from a few kbit/s to a few hundred Mbit/s over a distance from a few kilometers to around 100 kilometers. The useful frequency bands for transmitting these signals are in the range from approximately 1 GHz to approximately 100 GHz. The data signals support multiplexed digital telephone channels or a digital television signal, for example.

In the prior art, each terminal equipment includes a single antenna for emitting and receiving. The antenna is connected to the output of an emitter through a band-pass filter having a first pass-band and a circulator and to the input of a receiver through the circulator and another band-pass filter having a second pass-band. The emitter transposes a first data signal from an intermediate frequency to a first emit carrier frequency in a first predetermined useful frequency band corresponding to the first pass-band. A second data signal with a second carrier frequency and a second useful frequency band corresponding to the second pass-band is picked up by the antenna and is then transposed to the intermediate frequency in the receiver.

To prevent interference between the two data signals the carrier frequencies are different and, more particularly, the first and second frequency bands respectively for the first and second data signals are juxtaposed and separated by a guard band.

The bidirectional radio link is generally symmetrical. The two data signals generally have the same bit rate and the emitter of one terminal equipment is paired with the receiver of the other terminal equipment and vice-versa.

In another bidirectional radio link, disclosed in French patent application 2 744 308, in each terminal equipment the data signals are respectively emitted and received with crossed polarization by two antennas in separate frequency bands separated by an empty frequency band. A pilot frequency serves as a common local frequency for frequency transposition in the two equipments, according to the two transmission directions. The pilot frequency is transmitted as a pure frequency in a downlink direction in order to serve as a central modulation carrier frequency for the frequency band in an uplink direction.

In all the above prior art, the frequency spectrum occupied by the bidirectional radio link is at least equal to the sum of the two frequency bands respectively for the transmission directions.

In order to reduce the global useful frequency bandwidth for emitting and receiving in a terminal equipment of a bidirectional radio link, U.S. Pat. No. 5,691,978 proposes terminal equipments for a bidirectional radio link emitting and receiving simultaneously; each equipment having a first emitter and a first receiver. The first emitter emits a first data signal at a first carrier frequency identical to that at which the first receiver receives a second data signal. The terminal equipment comprises a single emit and receive antenna, or an emit antenna and a receive antenna.

The object of the invention is to provide terminal equipment for a bidirectional radio link emitting four data signals without using a priori four frequency bands and to reduce the useful bandwidth and the cost of the terminal equipment.

Accordingly, a terminal equipment for a bidirectional radio link emitting and receiving simultaneously, having a first emitter emitting a first data signal in a first useful frequency band identical to that in which a first receiver receives a second data signal, is characterized in that it comprises:

a second receiver receiving a third data signal in a second useful frequency band via a first antenna, a first circulator and a filter having the second useful frequency band as pass-band, and said first emitter emitting said first data signal in the first useful frequency band via a filter having the first useful frequency band as pass-band, the first circulator and the first antenna, and a second emitter emitting a fourth data signal in the second useful frequency band via a filter having the second useful frequency band as pass-band, a second circulator and a second antenna, said first receiver receiving the second data signal in the first useful frequency band via the second antenna, the second circulator and a filter having the first useful frequency band as pass-band.

Because the first useful frequency band is common to the first and second data signals and the second useful frequency band is common to the third and fourth data signals, the global useful frequency band for the link is halved compared to the prior art. This economy in terms of the frequency band obtained by the invention enables twice as many signals to be transmitted in a given useful frequency band than the prior art.

As will emerge in the remainder of the description, the first and second data signals emitted and received in the first common frequency band and the third and fourth data signals emitted and received in the second common frequency band are separated by respective separate emit and receive antennas and where applicable by two signal cancellers provided at the input of the first and second receivers in the terminal equipment.

Other features and advantages of the present invention will become more clearly apparent on reading the following description of plural preferred embodiments of the invention, which description is given by way of example only and with reference to the corresponding appended drawings, in which.

Figure 1:
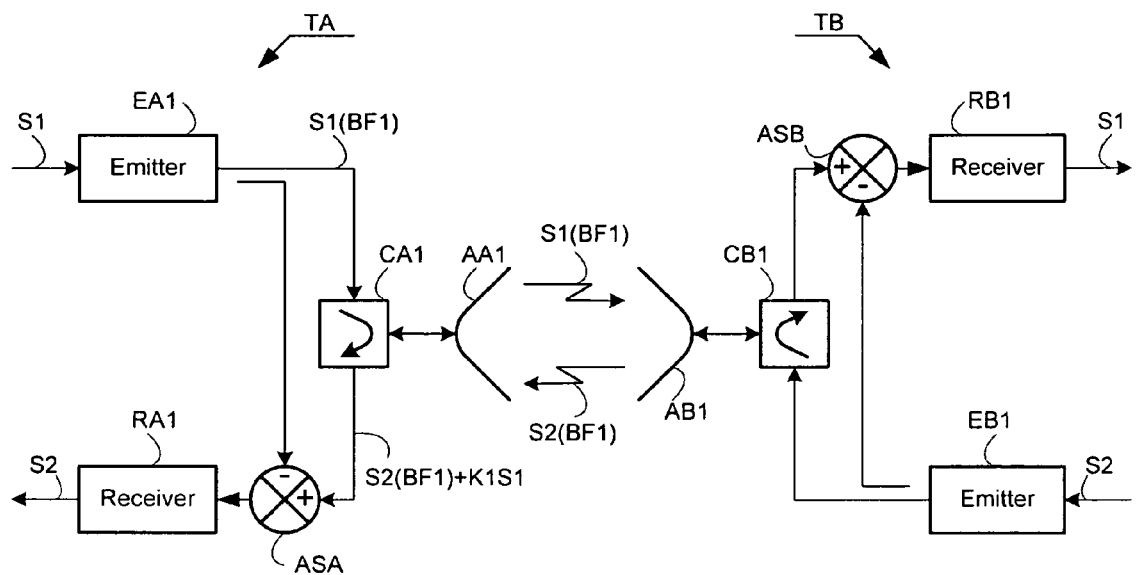
FIG. 1 is a schematic block diagram of a prior art bidirectional radio link with terminal equipments including a signal cancellers.

FIG. 1 shows a bidirectional radio link for simultaneous emitting and receiving of the type described in U.S. Pat. No. 5,691,978, which comprises at the respective ends thereof a terminal equipments TA and TB.

Each terminal equipment TA, TB essentially comprises an emitter EA1, EB1, a receiver RA1, RB1, a three-port circulator CA1, CB1, an emit-receive antenna AA1, AB1 and a signal canceller ASA, ASB.

Figure 3:
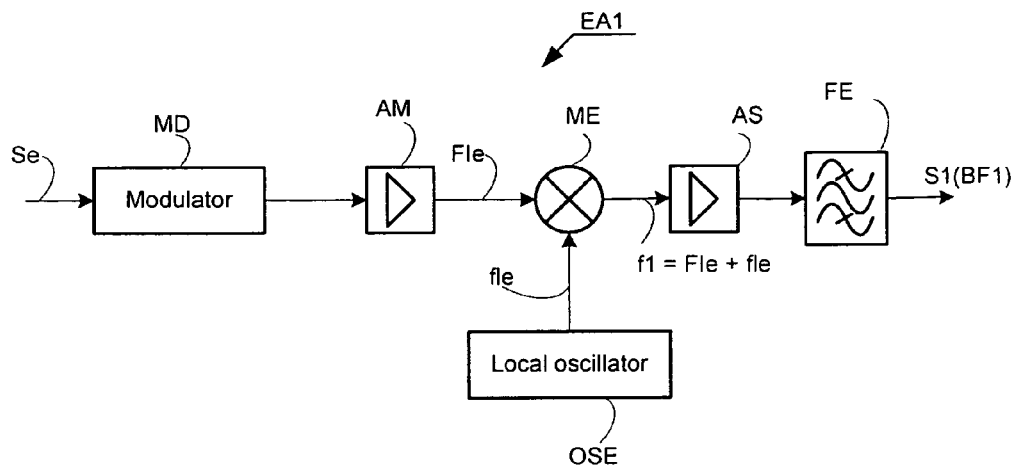
FIGS. 3 and 4 are schematic block diagrams of a emitter and a receiver in a terminal equipment, respectively.

For example, and as shown in FIG. 3, an emitter EA1, EB1 comprises a differential modulator MD with four phase states for modulating a data signal Se to be emitted. In the emitter EA1, EA2, the signal is modulated around an intermediate frequency FIe, then amplified in an amplifier AM and transposed around an emit frequency f1 in a mixer ME to which is fed a local signal at a frequency fle from a local oscillator circuit OSE. Where applicable, the data signal on the carrier f1 is amplified in an output amplifier AS and filtered in a band-pass filter FE before being fed to an input port of the circulator CA1, CB1 and emitted by the antenna AA1, AB1.

Figure 2:
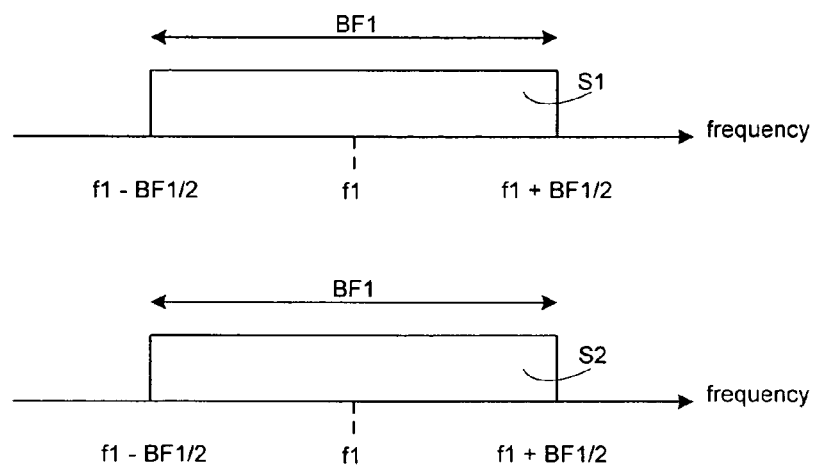
FIG. 2 is a diagram showing that the data signals emitted and received in a terminal equipment as shown in FIG. 1 have identical frequency bands.

As shown in FIG. 2, the signal S1 emitted by the emitter EA1, EB1 occupies a useful frequency band BF1 centered on the emit carrier frequency f1. For example, the carrier frequency f1 is equal to 23 GHz and the width of the useful frequency band BF1 is 28 MHz, i.e. the useful frequency band runs from 22.986 GHz to 23.014 GHz for a 155 Mbit/s data signal that is amplitude-modulated and phase-modulated according to a QAM modulation with 128 states.

Figure 4:
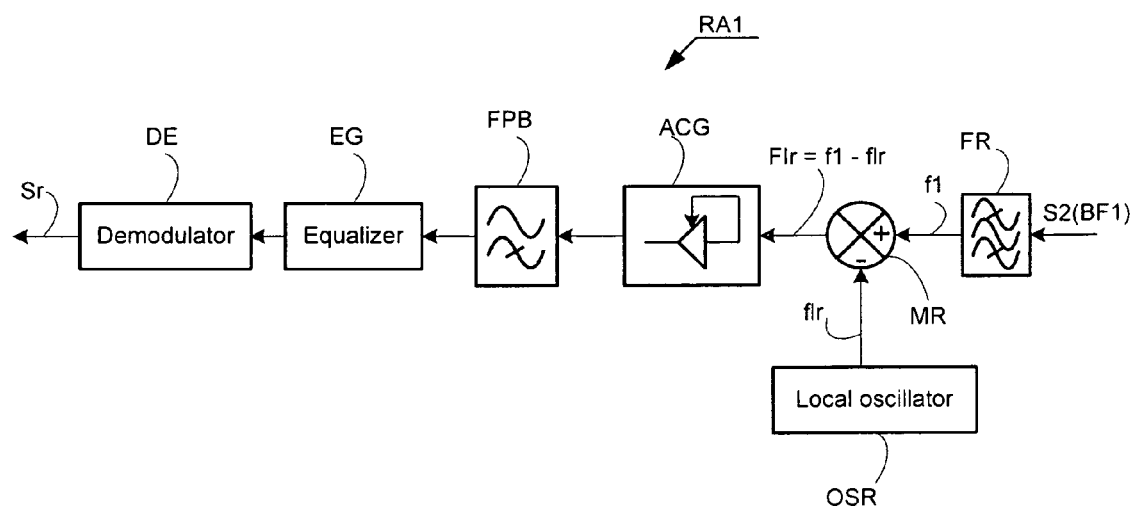

Referring to FIG. 4, the receiver RA1, RB1, comprises, for example, a mixer MR for transposing the frequency of a data signal S2 at a carrier frequency f1 that is received via the antenna AA1, AB1 and is applied from an output port of the circulator CA1, CB1, via the signal canceller ASA, ASB, where applicable via a receive band-pass filter FR and where applicable via a low-noise amplifier. The mixer MR transposes the receive frequency f1 into an intermediate frequency FIr=f1±flr, where flr is the frequency of a local signal produced by a local oscillator circuit OSR. The intermediate frequency signal FIr is then processed by an automatic gain control amplifier ACG, a low-pass or band-pass filter FPB and an equalizer EG with error corrector before or after being demodulated in a demodulator DE applying four phase state demodulation, for example, yielding a baseband digital signal Sr.

As also shown in FIG. 2, like the emitted signal S1, the signal S2 received via the antenna AA1, AB1 and applied to the receiver RA1 via the signal canceller ASA, ASB has a spectrum that is included in the frequency band BF1 around the carrier frequency f1.

A signal canceller, such as the signal canceller ASA in the terminal equipment TA, eliminates a portion K1S1 of the emitted signal S1 that is reinjected into the receiver RA1 in the terminal equipment TA and mixed with the signal S2 received via the circulator CA1.

Figure 5:
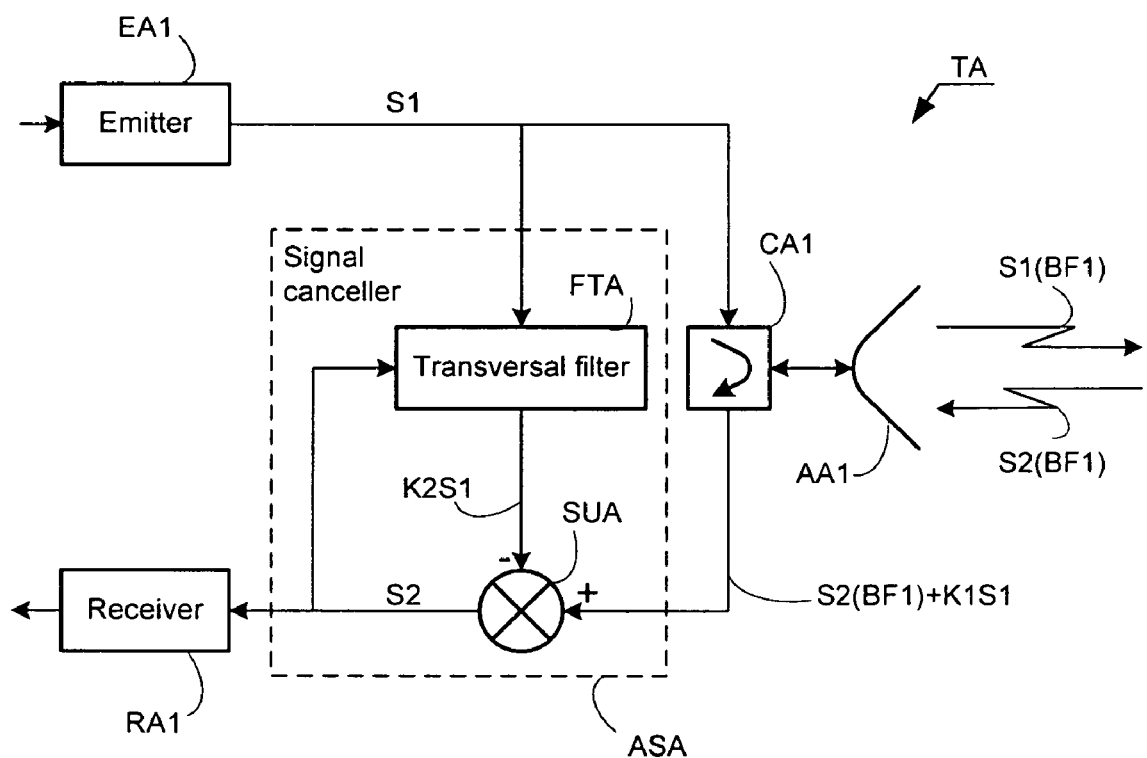
FIG. 5 is a schematic block diagram of a signal canceller connected between an emitter and a receiver in a terminal equipment as shown in FIG. 1.

The signal canceller ASA may comprise an adaptive digital transversal filter FTA and a subtractor SUA, as shown in FIG. 5 and as known in the art. The transversal filter FTA produces a convolution product of the emitted data signal S1 sampled at the output of the emitter EA1 and coefficients of the transversal filter FTA representing an impulse response of the emit-receive coupling path via the circulator CA1 for reinjecting an emitted signal portion K1S1. The transversal filter FTA estimates a synthesized emitted signal portion K2S1 that is applied with the opposite phase to the injected emitted signal portion K1S1 in the subtractor SUA connected between the output port of the circulator CA1 and the input of the receiver RA1

The coefficients K1 and K2 are complex coefficients, i.e. the coefficient K2 is estimated in amplitude and in phase in the transversal filter FTA. The coefficient K2 is self-adaptive, i.e. may vary over time, in order for the sum K1S1-K2S1 to converge toward zero at all times.

The signal canceller ASA may be entirely analog, or entirely digital, or may combine an analog portion for partially canceling the signal K1S1 and a digital portion for coarsely estimating the coefficients of the transversal filter FTA or a digital portion for estimating the coefficients more precisely in order to refine the correction in order to eliminate the injected emitted signal portion K1S1 combined with the received signal S2. Accordingly, the output of the subtractor SUA delivers a received signal S2 released from the emitted signal portion K1S1. To estimate the coefficient K2 at the output of the transversal filter FTA, the emitting of the received signal S2 may be interrupted briefly and periodically in the terminal equipment TB in order for the signal portion K1S1 only to be applied to the positive input of the subtractor SUA and an error signal produced by the subtractor SUA and applied to the transversal filter FTA to be minimized so as to converge toward zero.

Figure 6:
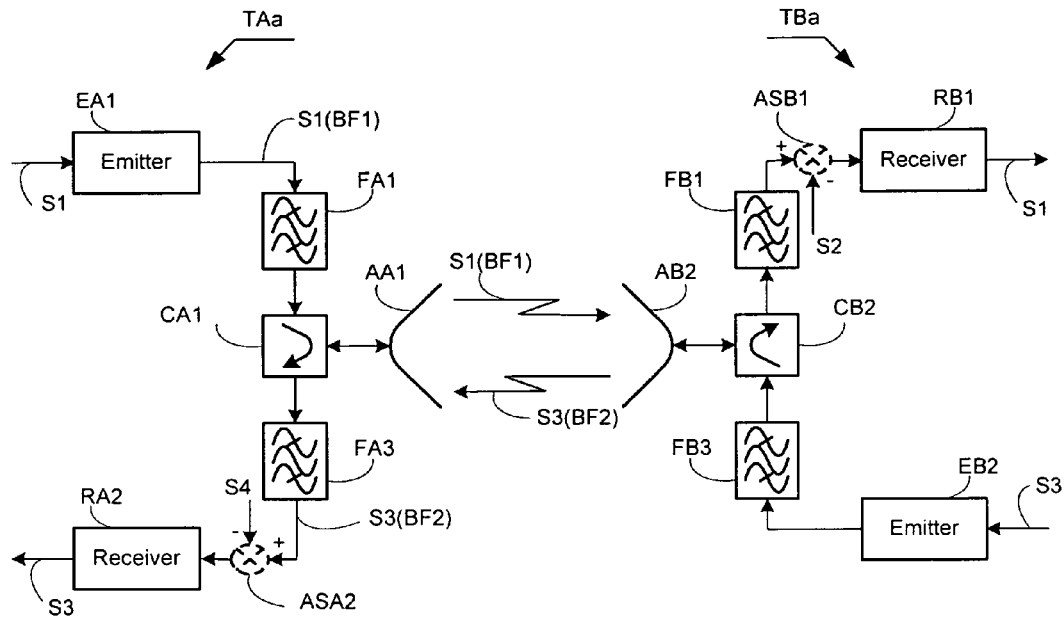
FIG. 6 is a schematic block diagram of a bidirectional radio link in which each terminal equipment of the invention emits two signals in different frequency bands and receives two other signals in the same two frequency bands.
Figure 6:
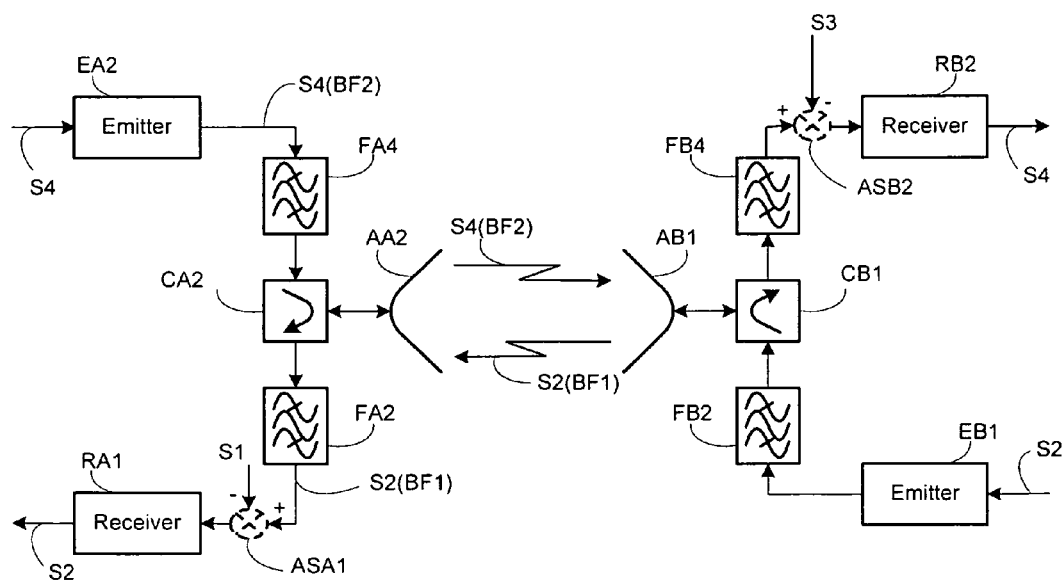

Referring now to FIG. 6, each terminal equipment TAa, TBa comprises a first emitter EA1, EB1 and a first receiver RA1, RB1 for emitting a first signal S1, S2 and receiving a second signal S2, S1, these two signals having a common frequency band BF1, as in the second embodiment shown in FIG. 6 in conjunction with FIG. 2. The terminal equipment TAa, TBa further comprises a second emitter EA2, EB2 and a second receiver RA2, RB2 so that the bidirectional radio link between the terminal equipment TAa and the terminal equipment TBa is duplicated. This duplicated bidirectional radio link therefore comprises:

a first bidirectional radio link with simultaneous emitting and receiving in which the first modulated data signal S1 in the first frequency band BF1 and having the carrier frequency f1 is emitted from the emitter EA1 to the receiver RB1 via the directional antennas AA1 and AB2, and a third modulated data signal S3 in a second frequency band BF2 is emitted by the emitter EB2 and received by the receiver RA2 via the antennas AB2 and AA1, and a second bidirectional radio link with simultaneous emitting and receiving in which the emitter EA2 emits a fourth modulated data signal S4 in the second frequency band BF2 and having the carrier frequency f2 via the directional antenna AA2 and received by the receiver RB2 via the directional antenna AB1, and the second modulated data signal S2 in the first frequency band BF1 is emitted by the emitter EB1 via the antenna AB1 and received by the receiver RA1 via the antenna AA2.

Figure 8:
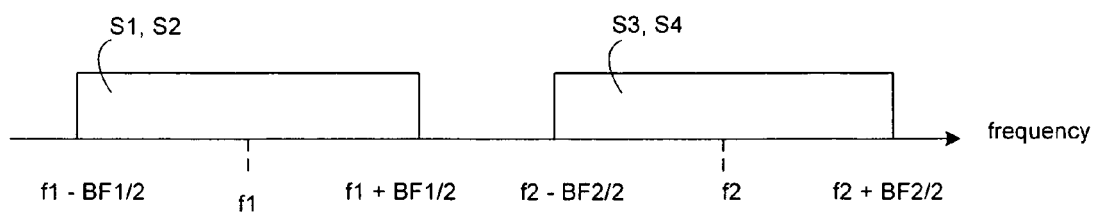
FIG. 8 is a diagram of the two different frequency bands for each terminal equipment of the invention.

As shown in FIG. 8, the two useful frequency bands BF1 and BF2 are juxtaposed with a guard band of the order of 10 MHz to 1000 MHz between them and are each used to emit and receive two signals S1 and S2, S3 and S4 at the same time in each terminal equipment TAa, TBa via two separate antennas AA1 and AA2, AB1 and AB2.

Figure 7:
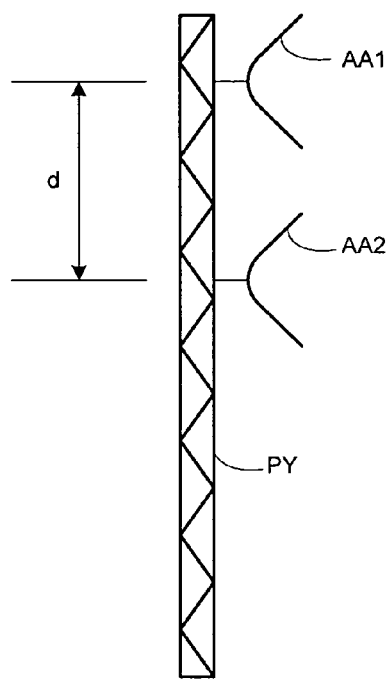
FIG. 7 is a schematic of a vertical mast supporting an antenna emitting in a vertical plane and an antenna receiving in a vertical plane for a terminal equipment of the invention.

As shown in FIG. 7, the antennas AA1 and AA2 in each terminal equipment TAa, TBa are disposed in a plane perpendicular to the parallel propagation directions of the two signals emitted and the two signals received.

The antennas AA1 and AA2, AB1 and AB2 may be superposed in a plane along a vertical at the top of a telecommunication mast PY. Alternatively, the antennas AA1 and AA2, AB1 and AB2 at the top of the mast are juxtaposed horizontally at the same height above the ground.

In order for a portion, such as the portion K1S1, of the emitted signal S1, S4 not to interfere with the processing of the received signal S2, S3 in the receiver of each terminal equipment, such as the terminal equipment TAa, and in order for the antennas to be relatively decoupled, the distance d between the antennas AA1 and AA2 becomes smaller as the respective frequency f1, f2 of these signals become higher. For a frequency f1, f2 greater than 1 GHz, the distance d is a few tens of centimeters. Typically, for an antenna diameter of 15 cm, the distance d is approximately 60 cm, i.e. in the range from a few wavelengths to a few tens of wavelengths. For frequencies less than 1 GHz the distance d is more than one meter. In all cases, care is taken that the interfering signal radiated laterally by the first antenna AA1 and picked up by the second antenna AA2 is such that the ratio of the useful signal to the interfering signal is sufficient, according to the transmission modulation and the transmission quality that are required.

Where appropriate, if the antennas AA1 and AA2, AB1 and AB2 are close together and/or not highly directional, each terminal equipment TAa, TBa preferably comprises a signal canceller ASA1 and ASA2, ASBL and ASB2 as shown in dashed line in FIG. 6. The signal canceller ASA1, ASBL is analogous to that described with reference to FIG. 5 and cancels a portion of the signal S1, S2 emitted by the antenna AA1, AB1 and picked up by the antenna AA2, AB2 and the signal canceller ASA2, ASB2 is analogous to that described with reference to FIG. 5 and cancels a portion of the signal S4, S3 emitted by the antenna AA1, AB1 and picked up by the antenna AA2, AB2.

In each terminal equipment TAa, TBa there are therefore two emitter-receiver-antenna arrangements analogous to the emitter-receiver-antenna arrangement in the first embodiment of a terminal equipment, shown in FIG. 1, but additionally with band-pass filters. For example, in each of the arrangements of the terminal equipment TAa relating to the two bidirectional radio links S1-S3 and S4-S2, the emitter EA1, EA2 emits the modulated data signal S1, S4 via a band-pass filter FA1, FA4, a three-port circulator CA1, CA2 and the directional antenna AA1, AA2, and the receiver RA2, RA1 receives the data signal S3, S2 from the directional antenna AA1, AA2 via the circulator CA1, CA2 and a band-pass filter FA3, FA2. The band-pass filters FA1 and FA2 and the band-pass filters FB1 and FB2 at the input of the receiver RB1 and at the output of the emitter EB1 in the terminal equipment TBa have pass-bands identical to the first frequency band BF1 of the first and second data signals S1 and S2. The band-pass filters FA3 and FA4 and the band-pass filters FB3 and FB4 at the output of the emitter EB2 and at the input of the receiver RB4 in the terminal equipment TBa have pass-bands identical to the second useful frequency band BF2 of the third and fourth data signals S3 and S4. In each of the two emitter-receiver arrangements in the terminal equipment TAa, the two band-pass filters FA1 and FA3, FA4 and FA2 and the circulator CA1, CA2 constitute a duplexer.

Accordingly, the emitter EA1, EA2, the receiver RA2, RA1 and the duplexer FA1-CA1-FA3, FA4-CA2-FA2 with the antenna AA1, AA2 together constitute a standard off-the-shelf terminal equipment, which considerably reduces the cost of the FIG. 8 bidirectional radio link, although the latter has a spectrum reduced to two frequency bands BF1 and BF2 for transmitting four data signals S1, S2, S3 and S4, instead of four frequency bands as in the prior art.

What is claimed is:

1. A terminal equipment for a bidirectional radio link, said terminal equipment being adapted to emit and receive simultaneously and including:

a first emitter adapted to emit a first data signal in a first useful frequency band and a first receiver adapted to receive a second data signal in said first useful frequency band, a second receiver adapted to receive a third data signal in a second useful frequency band via (a) a first antenna, (b) first circulator, and (c) filter having a passband for passing said second useful frequency band, said first emitter being adapted to emit said first data signal in said first useful frequency band via (a) a filter having a pass-band for passing said first useful frequency band, (b) said first circulator, and (c) said first antenna, and a second emitter adapted to emit a fourth data signal in said second useful frequency band via (a) a filter having a pass-band for passing said second useful frequency band, (b) a second circulator, and (c) a second antenna, said first receiver being adapted to receive the second data signal in said first useful frequency band via (a) said second antenna, (b) said second circulator, and (c) a filter having a pass-band for passing said first useful frequency band.

* * * * *